United States Patent [19]

Ladouceur et al.

[11] 3,845,860

[45] Nov. 5, 1974

[54] FASTENER STRIP

[75] Inventors: Harold A. Ladouceur, Livonia; John H. Matthews, Royal Oak, both of Mich.

[73] Assignee: Multifastener Corporation, Detroit, Mich.

[22] Filed: Nov. 24, 1972

[21] Appl. No.: 309,545

Related U.S. Application Data

[62] Division of Ser. No. 130,335, April 1, 1971, Pat. No. 3,711,931.

[52] U.S. Cl................ 206/338, 29/412, 151/41.71, 206/820
[51] Int. Cl.... B23p 17/00, B65d 79/00, B65d 85/20
[58] Field of Search......... 206/56 A, 56 AB, 56 DF, 206/59 R, 46 H, 65 F, 338

[56] References Cited
UNITED STATES PATENTS

| | | | |
|---|---|---|---|
| 2,387,983 | 10/1945 | Dickenson | 206/56 AB |
| 2,954,117 | 9/1960 | Freeburg | 206/56 A |
| 3,704,507 | 12/1972 | Grube | 206/56 A |
| 3,722,670 | 3/1973 | Plunkett | 206/56 DF |

*Primary Examiner*—William T. Dixson, Jr.
*Attorney, Agent, or Firm*—Cullen, Settle, Sloman & Cantor

[57] ABSTRACT

The disclosed fastener in the nut strip includes a pair of parallel retainer grooves adapted to receive a pair of retaining rods or wires which secure the fasteners in the preoriented strip form. The disclosed embodiment of the fastener is a pierce nut, which includes a generally rectangular body portion having a piercing face and a pair of flanges at the opposite face, one flange extending from each end of the nut. The rod retaining grooves are generally perpendicular to the opposite sides of the nut and located between the flanges and the axis of the threaded aperture. In the disclosed embodiment, the rods are inserted in the retaining grooves and the fastener, adjacent the grooves, is deformed to retain the rods in the grooves.

The disclosed nut strip and coil of this disclosure includes a plurality of aligned nuts each having a pair of grooves on either side of the nut bore and the frangible rods or elements are retained in the nut grooves and bridge adjacent nuts. the end faces of the nuts, adjacent the grooves, are knurled in the disclosed embodiment, which spaces the nuts on the rods, in close relation, securely retains the rods and deforming the cylindrical rods into an oval shape. The knurling provides a plurality of portions projecting over and engaging the rods.

21 Claims, 14 Drawing Figures

FIG. 14

FASTENER STRIP

RELATED APPLICATION

This application is a division of our copending application for United States patent, Ser. No. 130,335, filed Apr. 1, 1971, now U.S. Pat. No. 3,711,931.

FIELD OF THE INVENTION

The invention disclosed herein relates to preoriented fasteners, such as a strip of pierce nuts, which may be rolled into a coil of fasteners for use at the installation site and the method of forming same.

The prior art discloses a number of methods of preorienting fasteners, including a plurality of fasteners in a carrier strip, and integral carrier portion and fasteners secured in a strip on separate carrier members. The utilization of wires as the carrier member is also shown by the prior art. None of the preoriented fastener systems shown by the prior art have been commercially successful in retaining preoriented pierce nuts, for example, because the carrier means shown by the prior art interferes with the final installation of the pierce nut or structurally weakens the nut. Examples of the prior art include the following U.S. Pat. Nos.:

| | |
|---|---|
| 2,358,777 | 3,115,224 |
| 2,716,247 | 3,117,610 |
| 3,083,429 | 3,177,915. |

In the installation of pierce nuts, clinch nuts, or similar types of multi-threaded piercing fasteners, it is necessary to accurately position the fastener in a predetermined orientation at the point of utilization. Usually, the nuts are not symmetric about the axis of the threaded opening, and consequently, the nuts must be oriented about the axis in order for utilization with the die or punch. In the commercial method of installing pierce nuts, such orientation is accomplished by utilization of a hopper from which nuts are fed through a metallic or plastic feed chute to their point of ultimate use. In a pierce nut installation where a lerge number of nuts are to be installed in a single press operation, for example, several hoppers must be used. The expense of the hopper and the feed system apparatus, together with the requisite space for hopper installation, may be considerable, and further expenditures are normally required for the maintenance of the hoppers and the required chuting.

U.S. Pat. No. 3,140,010, which is assigned to the assignee of the instant application, discloses a method and apparatus for dispensing fasteners, such as pierce nuts, which includes adhesively fixing the fasteners to a continuous web, advancing the nuts on the web to a stripping location and stripping the fasteners from the web, normally at the point of installation. The instant application is designed to solve some of the problems inherent in the above referenced adhesive oriented fastener system, including elimination of the carrier strip or web, the adhesive bond and the requirement of stripping the fasteners from the carrier.

SUMMARY OF THE INVENTION

The preoriented fastener system of this invention starts with the rolling of a continuous strip of metal having a cross-section conforming to the cross-section of the fasteners to be formed. The strip is then chopped into separate fasteners and a threaded aperture is formed in each of the separate fasteners. The fasteners are then oriented into serial alignment, corresponding to the original continuous metal strip. The fasteners are joined in a continuous strip by readily frangible connector means connecting adjacent fasteners to one another.

The fasteners system of this invention is partially, although not exclusively, adapted to securing clinch nuts or pierce nuts in a preoriented strip without reducing the structural integrity of the individual nuts. The disclosed piercing fastener includes a rectangular body adapted to be received in a panel aperture, a pair of oppositely extending flanges at the bottom face of the body adapted to overlie the panel, and a threaded aperture extending through the body.

In the perferred embodiment of the fastener, a pair of retainer grooves or slots are provided in one surface of the nut, located between the flanges and the axis of the threaded aperture. The grooves may be located within the thread cylinder in certain applications, however, in the preferred embodiment the grooves are located adjacent the projection of the rectangular body portion or inwardly of the flanges. In the disclosed embodiment of the pierce nut, the retainer grooves are formed in the bottom wall of the fastener opposite the rectangular piercing face, however, the grooves may also be located in top surface or piercing face where spacing and strength requirements permit.

This location of the grooves does not reduce the structural integrity of the nuts, which is particularly important in pierce nuts where the nut is adapted to pierce its own hole in a panel, and does not functionally deform the threaded aperture. In the preferred embodiment, the retainer grooves have a slightly smaller width at the open side to improve the retention of the retaining rods and prevent turning of the rods as described hereinbelow.

The fasteners or nuts in the disclosed method are aligned for securement in side to side relation, with grooves linearly aligned to receive the rods. The rods are then secured in the grooves to form a continuous, preoriented strip of fasteners, as by deforming the wall of the nut, adjacent the grooves. The nuts in the strip preferably abut or nearly abut, to increase the nuts per unit length of strip and reduce the size of the coil of nuts. Where the nuts in the strip are pierce nuts, for example, the nuts are preferably closely spaced to eliminate wire blanks or tag ends which tend to jam the piercing head. Additional advantages are obtained by providing a slight space between the nuts in the strip, where the space is small enough to avoid tag ends. A slight space provides greater flexibility about the nut coil axis and sufficient flexibility perpendicular to the strip axis, in the plane of the strip, to reduce breakage. A greater shear strength is also obtained, which is important to permit handling of the nuts in the strip or coil form.

In the preferred embodiment of the methods of forming a strip of fasteners, a knurling tool having a plurality of teeth deforms the open end of the grooves, after receipt of the retaining rods or wires. The utilization of a knurling tool provides some unexpected advantages in the method of this invention, including automatically spacing the nuts in the strip. The knurling tool deforms the nut adjacent the groove opening to provide a plurality of retainer portions overlying the wires or rods.

Where a circular wire and groove is utilized, the knurling tool also deforms the wire to an oval configuration, which prevents turning of the wire and improving retention. The utilization of a knurling tool has also been found to provide better retention of the retaining rods.

The strip of fasteners may then be rolled in a coil form, with the wires adjacent the axis of the coil, and delivered to the installation station. The end of the coil may then be fed to an installation tool, such as the piercing head of a pierce nut installation system. Where the nuts are closely spaced, a conventional piercing head may be utilized. The separate rods in the fastener strip of this invention substantially reduces waste of materials and fasteners, in that imperfect fasteners may be discarded prior to assembly on the rods, which is not possible where the retainer means are integral with the fasteners.

Other advantages, objects and meritorious features of this invention will more fully appear from the following Description of the Preferred Embodiments, claims and accompanying drawings.

DESCRIPTION OF THE PREFERRED EMBODIMENTS

Figure 1:
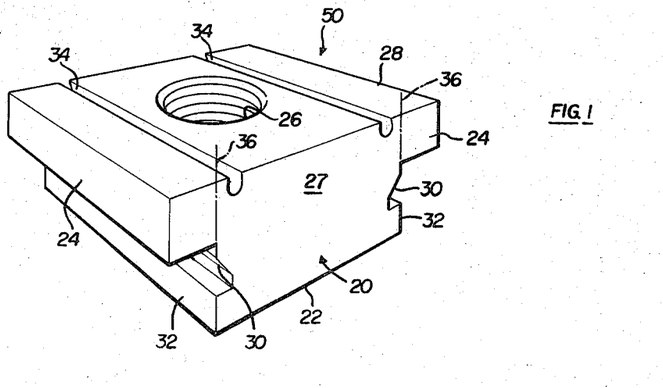
FIG. 1 is a bottom perspective view of one embodiment of the fastener of this invention.
Figure 2:
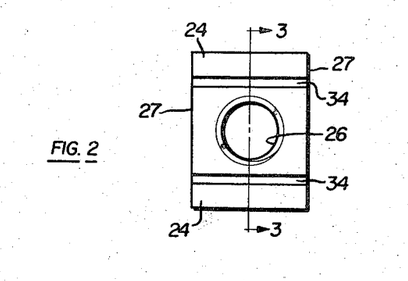
FIG. 2 is a bottom view of the fastener shown in FIG. 1.
Figure 3:
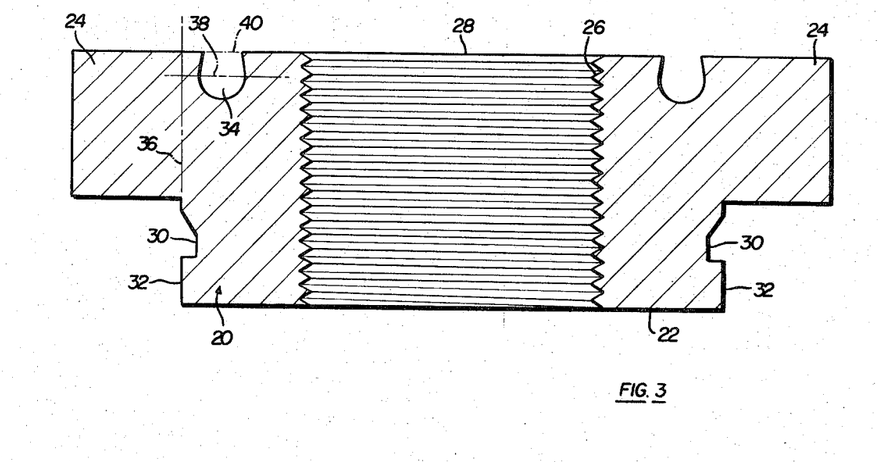
FIG. 3 is a side, cross-sectional view of the embodiment of the fastener shown in FIG. 2, in the direction of view arrows 3—3.
Figure 4:
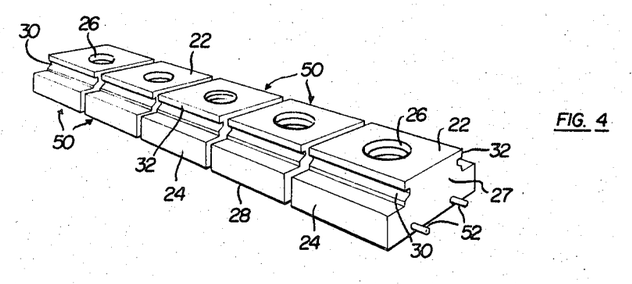
FIG. 4 is a top perspective view of one embodiment of the fastener strip of this invention.

The particular fastener shown in FIGS. 1 to 3 is a multipurpose pierce and clinch nut, such as disclosed in U.S. Pat. No. 3,187,796, which is assigned to the assignee of the instant application. Reference may be made to the above referenced patent for specific details of the pierce nut which are not disclosed herein, including the method of installing the pierce nut in a panel. The pierce nut includes a body portion 20 having a generally rectangular end portion or piercing face 22 at the top or piercing end of the fastener, a pair of oppositely extending flange portions 24 at the bottom 28 of the fastener, one flange extending from each end of the fastener, and a threaded aperture 26 extending through the body portion, perpendicular to the plane including the flange portion 24. The sides 27 of the pierce nut are preferably flat or substantially planar. As described in the above patent, the pierce nut is adapted to pierce its own hole in a panel, wherein the nut serves as the punch, and is forced through the panel or plate to form its own hole. The nut is provided with undercut grooves 30, located between the top of the flange portions 24 and the piercing face of the nut 22, into which the panel is deformed by a die operation to secure the nut to the panel in a single stroke of the press. The grooves 30 define a shoulder 32 which provides the piercing edge of the nut.

In the disclosed embodiment of the fastener of this invention, a pair of linear grooves 34 are defined in the bottom 28 of the nut, generally perpendicular to the axis of the threaded aperture 26 and the side faces of the nut 27, and parallel to the panel receiving grooves 30. The retainer grooves 34 are adapted to receive and secure the retaining rods, as described hereinbelow. Because of the severe loads to which the nut may be subjected and the piercing installation requirements of a pierce nut, the location of the grooves 34 are particularly important to the fastener of this invention. In the preferred embodiments, the grooves are located between the projection 36 of the rectangular piercing face 22 and the axis of the threaded aperture 26. That is, the grooves are preferably located inwardly of the flanges, between the flanges and the axis of the aperture. This location does not functionally decrease the strength of the fastener member, which is particularly important in pierce nut applications, and does not deform or otherwise interfer with the threaded aperture 26. For example, a conventional pierce nut, such as shown in U.S. Pat. No. 3,187,796, failed in an axial loading test at 3,305 pounds average. The same pierce nut, with the retainer grooves 34 open as shown in FIGS. 1 to 3, failed at 2,825 pounds, average. With the wire retainer members inserted and knurled in position, however, as shown in FIGS. 4 to 8, the pierce nuts tested failed at 3,200 pounds, average and the fracture was axially through the center in each case. The difference between the first and last case is therefore not believed to be a result of the retainer grooves and the pierce nut was not weakened by the installation of the retaining rods.

Figures 5, 6, 7, 8, 9:
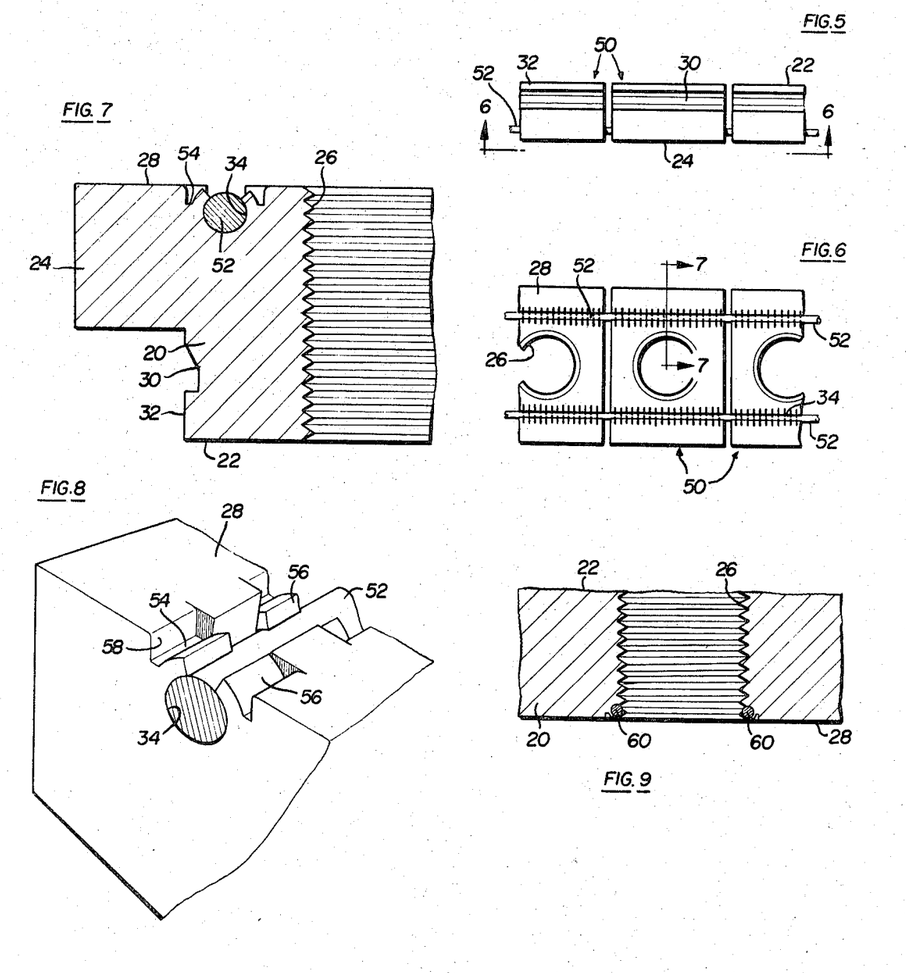
FIG. 5 is a side view of the fastener strip shown in FIG. 4.
FIG. 6 is a bottom view of the fastener strip shown in FIG. 5, in the direction of view arrow 6—6.
FIG. 7 is a partial, side cross-sectional view of the embodiment of the fastener strip shown in FIG. 6, in the direction of view arrows 7—7.
FIG. 8 is a bottom perspective view of FIG. 7.
FIG. 9 is a partial cross-sectional view of another embodiment of the fastener and strip of this invention.

As shown in FIG. 3, the grooves 34 are preferably generally perpendicular to the planar sides of the nuts to permit orientation. In this embodiment, the grooves are circular to receive retaining rods which are generally circular in cross-section. In this embodiment, the width of the groove, at the open end 40, is less than the maximum width of the groove 38. The width of the groove at the open end or side 40 is preferably substantially equal to the diameter of the rod or wire and the diameter of the circular portion 38 is preferably slightly larger than the diameter of the wire. The retaining grooves may be formed by conventional rolling techniques, wherein the groove walls are first rolled up, from the wall of the nut, then over the groove. When the wall of the nut is then deformed over the wire, as by knurling, the wire is deformed into an oval cross-section, as best shown in FIG. 7. The wire is permitted to expand into the oversize portion of the groove which results in the oval cross-section. This dimensional relationship also permits more material to be deformed over the wire and substantially improves the retention of the wire. For example, a groove suitable for a 0.035 inch diameter wire would be 0.040 inches deep, 0.040 inches in width or maximum diameter, at 38, and 0.035 inches in width at the open side 40. The deformation of the wire into an oval cross-section not only improves the retention of the wire in the groove, but also inhibits rotation of the wire, and reduces the required knurling pressure.

The preoriented fastener strip shown in FIGS. 4 to 8 includes a plurality of the pierce nuts 50, as described hereinabove. The pierce nuts in the strip may be identical to the pierce nuts described hereinabove and therefore the same reference characters have been used. The nuts are aligned in this embodiment in side to side relation, with the retainer grooves 34 linearly aligned to receive the retaining rods or wires 52. The retaining rods are preferably formed from a relatively flexible material which can be cut off in a die head, especially where the fasteners are pierce nuts, as described above. A suitable material for the rods is annealed 1008 low carbon steel, which is not heat treated. This material provides greater ductility and flexibility than music wire, for example, and does not dull the piercing head as would music wire. Other suitable materials include monofilament nylon cord and cable. Cable may be preferred in certain applications where the fastener strip is handled often.

The pierce nuts are preferably closely spaced for the reasons given hereinabove, however in certain applications the nuts may be spaced as desired on the retaining rods. The sides of the nuts may also be abut where space is an important consideration. Where the rods are secured by knurling, the nuts are essentially uniformly spaced. A nut spacing which provides the desired strip flexibility without wire tag ends which tend to jam the piercing head, is 0.005 inches to 0.015 inches. A spacing of 0.060 inches has however been found suitable where tag ends are not a problem.

Figures 10, 11:
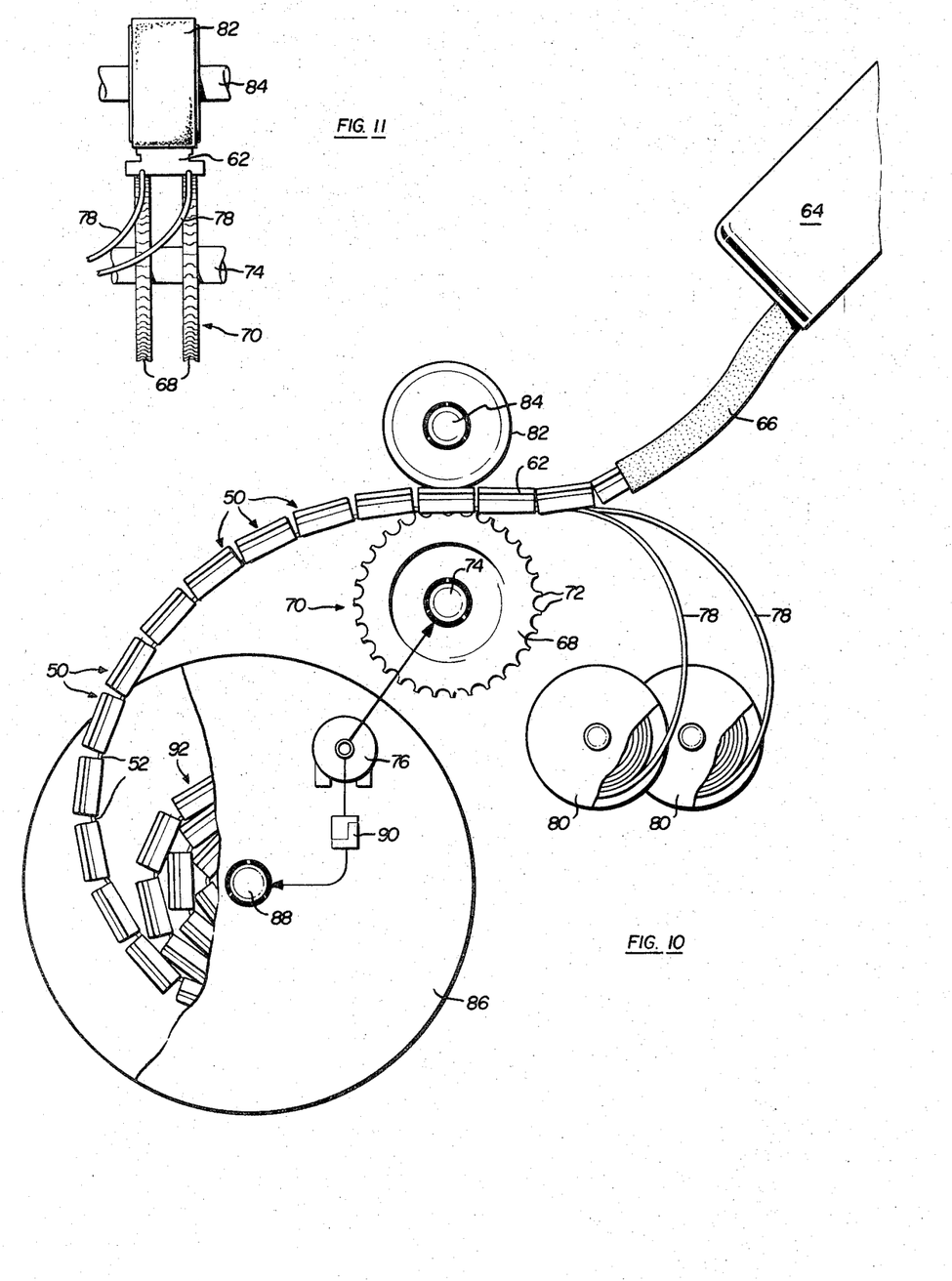
FIG. 10 is a side, partially schematic side elevation of one embodiment of an apparatus adapted to carry out the method of this invention.
FIG. 11 is an end view of a portion of FIG. 10, showing the knurling step.

The knurling tool 70 shown in FIGS. 10 and 11 deforms the bottom 28 of the nut immediately adjacent the retainer groove 34 as shown in FIGS. 7 and 8. The radially extending teeth 72 of the knurling tool deform the metal inwardly to form pockets or grooves 54. The metal is thereby extruded or deformed over the rods 52 to provide retainer portions 56 which securely lock the rods or wires in the retainer grooves. It will be understood that the particular configuration of the notches 54 and the retainer portions 56 depend upon the shape of the teeth 72 on the knurling tool. The teeth 72 of the embodiment of the knurling tool shown provide a generally vertical wall 58 adjacent the retainer portion. This configuration has been found to provide an excellent locking action, however, other knurling teeth configurations may be utilized as required by the installation. As described above, the knurling tool also deforms the generally circular rods or wires into an oval cross-section, which aids in the retention of the wires and inhibits rotation. Rotation becomes particularly important where the rods are closely spaced or one rod is utilized in the strip.

The embodiment of the preoriented nut strip shown in FIG. 9 may be identical to the embodiment shown in FIGS. 4 to 8, except the retaining rods 60 in this embodiment are located substantially within the thread cylinder of the threaded aperture 26. The location of the retaining rods 52 immediately adjacent the projection 36 of the rectangular end or top portion 22 is preferred for pierce nuts, however in certain other applications the retainer members may be positioned inward of this position. In FIG. 9, for example, rods 60 are located within the thread cylinder to provide a thread locking feature and greater side flexibility.

In the apparatus shown in FIGS. 10 and 11, the fasteners or nuts 62 are automatically secured on the retaining rods 52 in a strip form 50, as described above, and coiled for use at the nut installation station, described hereinbelow. The nuts may be oriented in a conventional hopper, such as described in U.S. Pat. Nos. 3,334,724 and 3,430,808, which are assigned to the assignee of the instant application. The nuts are fed from the hopper through a suitable chuting 66, as described in the above patents to the knurling tool 70. The knurling station in this embodiment includes a pair of knurling tools 68 having a plurality of radially extending teeth 72 as described hereinabove. The knurling tools are mounted on a suitable shaft 74 which is driven by a motor 76. This drive mechanism is not shown, as any suitable drive means may be utilized. Where two retaining rods or wires are used in the preoriented nut strip, a pair of wires 78 are fed to the knurling tool 70 from freely rotatable spools 80.

The motor driven knurling tools 68, in this embodiment are rolled over the wires 78 to deform the bottom of the pierce nut, as described hereinabove. A backup or support roller 82 is provided, in this embodiment, which is mounted on a shaft 84. The preoriented nut strip 50 is then coiled on a motor driven nut coil spool 86. The spool is mounted on a shaft 88, which is also driven by motor 76 through clutch mechanism 90. The clutch mechanism is provided to prevent pulling apart or deformation of the nut coil strip. It will be noted that the preoriented nut strip 50 is coiled with the retaining rods or wires 52 at the inner end of the pierce nuts, adjacent the axis 88 of the coil. When the coil of nuts 92 is completed, the apparatus is stopped and the coil is delivered to an installation station such as in FIG. 12.

Figure 12:
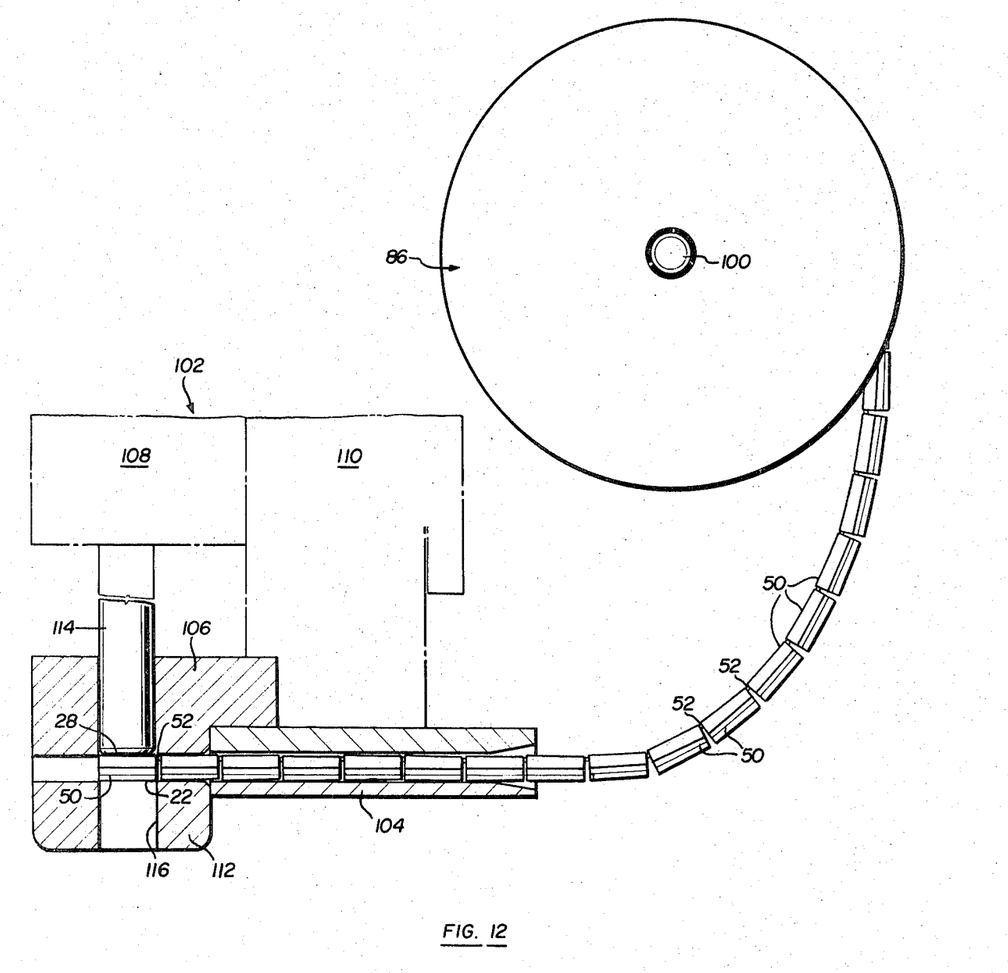
FIG. 12 is a partially cross-sectioned end view of the installation apparatus of the fastener strip of this invention, showing the installation step in the method of this invention.

FIG. 12 illustrates, somewhat schematically, one embodiment of a pierce nut installation apparatus suitable for securing a pierce nut from the preoriented nut coil strip of this invention. Reference may be made to U.S. Pat. Nos. 3,089,670 and 3,098,576, which are assigned to the assignee of the instant application, for a more detailed description of a pierce nut head assembly and the method of securing a pierce nut to a panel or the like. As described above, a pierce nut serves as the piercing punch in the installation assembly and the pierce nut head is adapted to be installed directly in a forming press, or the like. The pierce nut is thus adapted to pierce its own hole in a panel, or the like, and is secured within the panel opening in a single stroke of the press. In the disclosed embodiment of the pierce nut, the panel is deformed into the grooves 30 adjacent the flange portion 24, however, various other designs of pierce nuts and clinch nuts may also be utilized in the preoriented fastener system of this invention and the installation apparatus shown in FIG. 12.

The installation assembly shown in FIG. 12 includes the nut coil spool 86 which may be formed by the apparatus shown in FIG. 10. In this embodiment, however, the supporting shaft 100 is rotatable to feed the preoriented pierce nuts 50 to the head assembly, indicated generally at 102. The end of the preoriented pierce nut strip or coil is fed to the feed block 104, which includes a tapered opening to receive the nuts. The nuts are finally received in the lower housing assembly 106. The upper housing assembly 108 an guide post assembly 110 are only outlined in FIG. 12 to show their location. The feeding apparatus, which may be any conventional fastener feed assembly has not been shown. The panel, which is to receive the pierce nut, is disposed between the nose piece 112 of the operation of the head assembly the structure of the die member. In this embodiment, the plunger 114 is actuated toward the panel to engage the botton 28 of the pierce nut 50 shearing the retaining rods and forcing the pierce nut through the opening 116 against the panel. The force of the plunger 114 causes the generally rectangular top portion 22 of the pierce nut to pierce the panel in one stroke of the plunger, and the die member forces the pierced wall of the panel into the grooves 30 of the nut.

Figure 13:
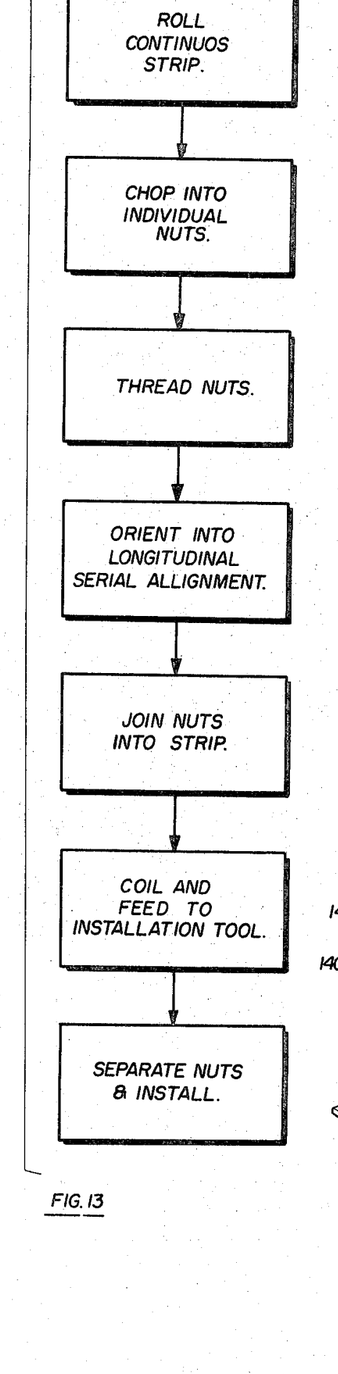
FIG. 13 is a flow diagram of the method of this invention.
Figure 14:
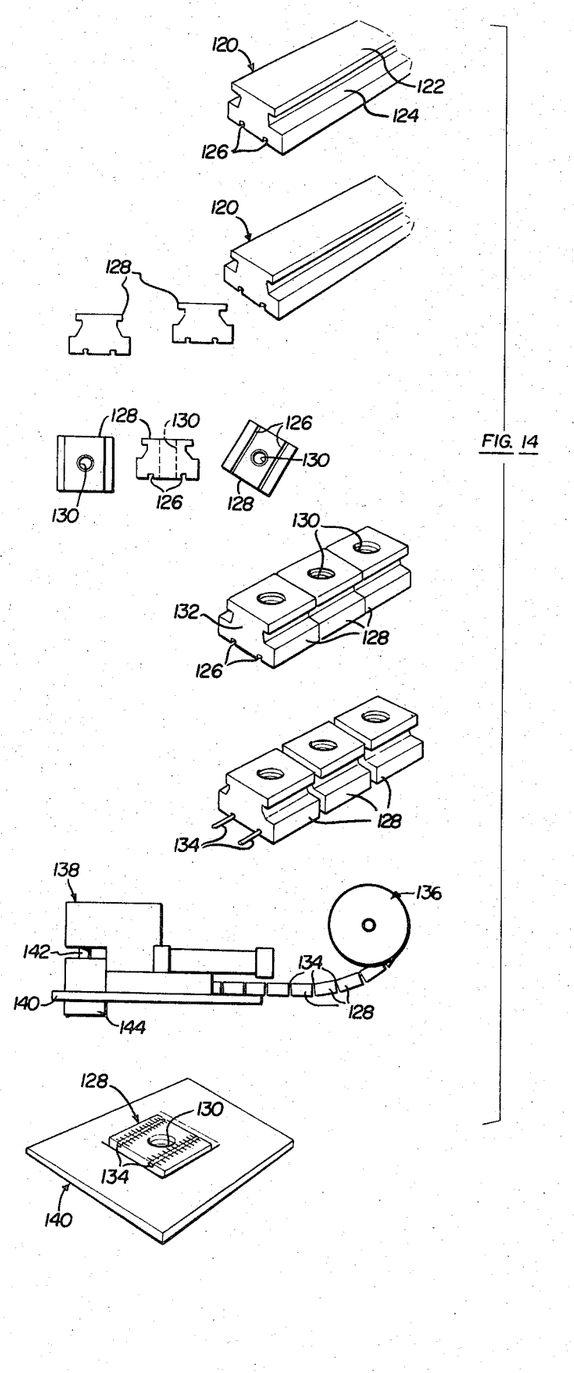
FIG. 14 illustrates the steps of the method shown in FIG. 13.

FIGS. 13 and 14 disclose the overall method of forming the preoriented nut strip of this invention and the installation of a nut from the strip. The strip 120 may be rolled or otherwise formed in a continuous rolling mill or the like. In the commercial method of forming pierce nuts, the strip 120 is rolled from round wire stock, such as resulfurized 1108 steel. It will be noted that the cross section of the strip 120 corresponds to the cross section of the pierce nut described hereinabove, including the generally rectangular body portion 122 and the opposed flanges 124. The disclosed embodiment of the strip also includes a pair of retainer grooves 126 which may be rolled in the strip 120 at the mill. The strip is then chopped into separate or individual fasteners or pierce nuts 128. In the commercial process, the metal strip is received in a sizing die, pierced and sheared in a continuous blanking press. The pierced aperture is then threaded in a tapping machine, forming a threaded aperture 130. A conventional continuous tapping machine may be utilized.

The individual nuts are then oriented into serial alignment, which in the preferred embodiment corresponds to the continuous metal strip 120. In the disclosed method, the nuts are aligned in side to side relation with the side walls 132 abutting and the grooves 126 coaxially aligned. The nuts may be oriented in a conventional rotating hopper, or the like, such as disclosed in FIG. 10. The nuts are then joined in the oriented serial alignment by readily frangible connector means, which connects adjacent nuts one to another. In the disclosed embodiment, the frangible connection means is the pair of wires or rods 134. The rods are inserted into the grooves 126 and secured by the apparatus shown in FIGS. 10 and 11 or other suitable means.

The preoriented fastener strip may then be coiled as shown in FIG. 10. Finally, the fastener coil 136 may be fed to an installation tool 138, wherein the nut is secured to a panel 130 or the like. A pierce nut installation tool is shown in FIG. 13 at 102, which includes an actuatable plunger 114. Following the method disclosed in FIG. 12, the pierce nuts 128 are serially interposed between an actuatable plunger 142 and the panel 140 as shown in FIGS. 13 and 14, in which a pierce nut is to be installed. The plunger is then actuated toward the panel, to sever the frangible joining means of the interposed pierce nut, from the coil 136, and to pierce the severed nut 128 through the panel, in a single stroke of the plunger 142. The frangible joining means in the disclosed embodiment are the rods 134. The panel in the disclosed embodiment is forced into the grooves 30 (See FIGS. 3 to 7) by the die member 144, to securely lock the nut in the panel opening, a previously described. Other securement means, including staking, may also be utilized.

It will be understood that the preoriented fastener system and method of this invention is not excluxive to pierce nuts or clinch nuts, except as claimed hereinbelow. The invention does however have particular application to the pierce nut system because of the rigid strength and tolerance requirements of a self-piercing fastener, the problems of the commercial high speed feeding equipment, including the space and service requirements of the hoppers and chuting, and the desire to utilize the present manufacturing and installation apparatus and techniques of the pierce nut system wherever possible. The preoriented fastener system and method of this invention eliminates the requirement of hoppers, chuting and other feed equipment at the installation site which is particularly important in the relatively complex pierce nut installation apparatus.

We claim:

1. A continuous strip of nuts, comprising, in combination, a plurality of generally aligned nuts, each nut having a bore therethrough generally perpendicular to the axis of said strip, and an end face perpendicular to the axis of said bore and a pair of generally linear grooves in said nut end face, on either side of said bore and generally parallel to the axis of said strip, and a continuous frangible element disposed in each of said grooves, bridging adjacent nuts, and said nut end face including a portion deformed over each of said frangible elements to retain said nuts on said frangible elements in a continuous strip.

2. The continuous strip defined in claim 1, characterized in that said nuts each include a pilot portion and a laterally extending flange portion adjacent said end face, said grooves defined in said end face adjacent the projection of said pilot portion.

3. The continuous strip defined in claim 2, characterized in that said grooves are defined between the projection of said pilot portion and said nut bore, on either side of said bore.

4. The continuous strip defined in claim 1, characterized in that said end face, adjacent said grooves, is knurled, having portions projecting over said frangible elements and retaining said nuts on said frangible elements.

5. The continuous strip defined in claim 4, characterized in that said frangible elements are generally oval in cross-section where retained in said grooves, with the maximum diameter generally perpendicular to the axis of said frangible elements.

6. The continuous strip defined in claim 5, characterized in that said grooves include portion between said projecting portions of said nut end faces having a width which is less at said nut end face than the maximum width of said grooves.

7. The continuous strip defined in claim 6, characterized in that the bottom wall of said grooves are generally cylindrical, extending the entire length of said end faces.

8. The continuous strip defined in claim 1, characterized in that said nuts are polygonal having confronting, generally parallel side faces of adjacent nuts, said side faces of the adjacent nuts in the strip being substantially uniformly closely spaced.

9. A continuous strip of self-piercing fasteners, including at least three, aligned self-piercing fasteners, each fastener having a polygonal body portion, a flange portion extending laterally from an end face of said body portion, a pilot portion projecting from said flange portion having an end face opposite said body portion end face, a bore extending through said pilot portion, generally perpendicular to said end faces of the fastener and the axis of said fastener strip and at least two linear grooves in one of said end faces, generally parallel to the axis of said fastener strip, said grooves extending the length of said one end face on either side of said bore, and a linear frangible element secured in each of said grooves, bridging adjacent fasteners, and retaining said fasteners in a continuous strip.

10. The strip of self-piercing fasteners defined in claim 9, wherein said fasteners are adapted to be serially severed from said strip and secured to a structural member, characterized in that said grooves are defined in said body portion end face and said fasteners are substantially uniformly spaced on said frangible elements.

11. The strip of self-piercing fasteners defined in claim 10, characterized in that said body portion of each fastener includes two oppositely extending flanges, said flanges extending generally perpendicular to the axis of said strip.

12. The strip of self-piercing fasteners defined in claim 10, characterized in that said fasteners each include flat side faces, said side faces of adjacent fasteners being generally parallel and closely spaced to eliminate broken ends of said frangible elements during securement of said fasteners to said structural element.

13. The strip of self-piercing fasteners defined in claim 10, characterized in that said grooves are located between the projection of said pilot portion, on either side of said bore.

14. The strip of self-piercing fasteners defined in claim 9, characterized in that said one end face of said fasteners, adjacent said grooves, are knurled, including a plurality of portions overlying and engaging said frangible elements to securely retain said fasteners on said frangible elements.

15. The strip of self-piercing fasteners defined in claim 14, characterized in that said frangible elements are continuous and oval in cross-section having a maximum diameter generally perpendicular to the axis of said frangible elements.

16. A strip of fasteners, comprising, in combination: a plurality of generally aligned fasteners, each fastener having a generally rectangular body portion at the top of the fastener, a pair of oppositely extending flange portions adjacent the bottom wall of the fastener, one flange extending from each end of the fastener, the side walls of each said fastener being generally flat, a threaded aperture extending through said body portion about an axis generally perpendicular to the plane including said flanges and a pair of generally linear retainer grooves defined in the bottom wall of each of said fasteners and located within the projection of said body portion, the longitudinal axis of the grooves being generally perpendicular to said side walls, said fasteners aligned with their side walls adjacent to one another and the retainer grooves of adjacent fasteners being generally coaxially aligned, and a pair of retaining rods joining the adjacent fasteners, one rod being received and fixedly secured in each of the coaxially aligned retainer grooves, so that said fasteners are retained in a strip form.

17. The strip of fasteners defined in claim 16, characterized in that the side walls of the fasteners in the strip are nearly abutting.

18. The strip of fasteners defined in claim 17, characterized in that the side walls of the fasteners in the strip are substantially uniformly spaced between approximately five and fifteen thousands of an inch.

19. The strip of fasteners defined in claim 16, characterized in that said bottom wall of the body portion is deformed over the retaining rods and the open end of the retainer grooves to securely retain the fasteners on the retaining rods.

20. The strip of fasteners defined in claim 19, characterized in that said body portion of each of the fasteners includes a plurality of retainer portions overlying said retaining rods which securely retain said fasteners on said retaining rods.

21. The strip of fasteners defined in claim 16, characterized in that said retaining rods are generally oval in cross-section, where retained in said grooves, with the maximum diameter generally perpendicular to the axis of the rods.

* * * * *